United States Patent [19]

Ida et al.

[11] Patent Number: 5,065,433
[45] Date of Patent: Nov. 12, 1991

[54] AUDIO SIGNAL DATA PROCESSING SYSTEM

[75] Inventors: Kazunaga Ida; Tatsushi Iizuka; Makio Yamaki; Hiroyuki Ishihara; Yukio Matsumoto; Kazuhiro Hayashi, all of Tokyo, Japan

[73] Assignee: Pioneer Electronic Corporation, Tokyo, Japan

[21] Appl. No.: 476,949

[22] Filed: Feb. 8, 1990

[30] Foreign Application Priority Data

Jun. 26, 1989 [JP] Japan .................................. 1-163321
Jun. 26, 1989 [JP] Japan .................................. 1-163323
Jun. 26, 1989 [JP] Japan .................................. 1-163324

[51] Int. Cl.$^5$ .............................................. H03G 3/00
[52] U.S. Cl. ...................................... 381/63; 84/630; 84/DIG. 26
[58] Field of Search ...................... 381/63, 62; 84/630, 84/707, 631, 632, DIG. 26

[56] References Cited

U.S. PATENT DOCUMENTS

| | | | |
|---|---|---|---|
| 4,392,405 | 7/1983 | Franz et al. | 84/630 |
| 4,570,523 | 2/1986 | Futamase et al. | 84/630 |
| 4,586,417 | 5/1986 | Kato et al. | 381/63 |
| 4,803,731 | 2/1989 | Niimi et al. | 381/63 |

FOREIGN PATENT DOCUMENTS 64-72615 3/1989 Japan .

Primary Examiner—Forester W. Isen
Assistant Examiner—Sylvia Chen
Attorney, Agent, or Firm—Foley & Lardner

[57] ABSTRACT

An audio signal data processing system comprises an input device sequentially supplying incoming audio signal data, a data memory control device writing and reading-out the audio signal data into and from a data memory, a delay memory control device sequentially reading-out the audio signal data from the data memory and storing the data into a delay memory and sequentially reading-out the audio signal data from the delay memory and writing the data into the data memory, an arithmetic device multiplying predetermined coefficient data by the audio signal data having been read-out by the delay memory control device and written into the data memory and summing up results of the multiplication. The arithmetic device includes a plurality of multiplication and summing devices multiplying coefficient data by the audio signal data for each of data groups which are obtained by grouping a predetermined number of the audio signal data read-out by the reading device sequentially in the order of reading and subsequently summing up the multiplied values, and a filter device for executing a filter characteristic operation for calculated values respectively obtained by each of the multiplying and summing device, wherein a filter characteristic of the filtering device is made adjustable.

3 Claims, 14 Drawing Sheets

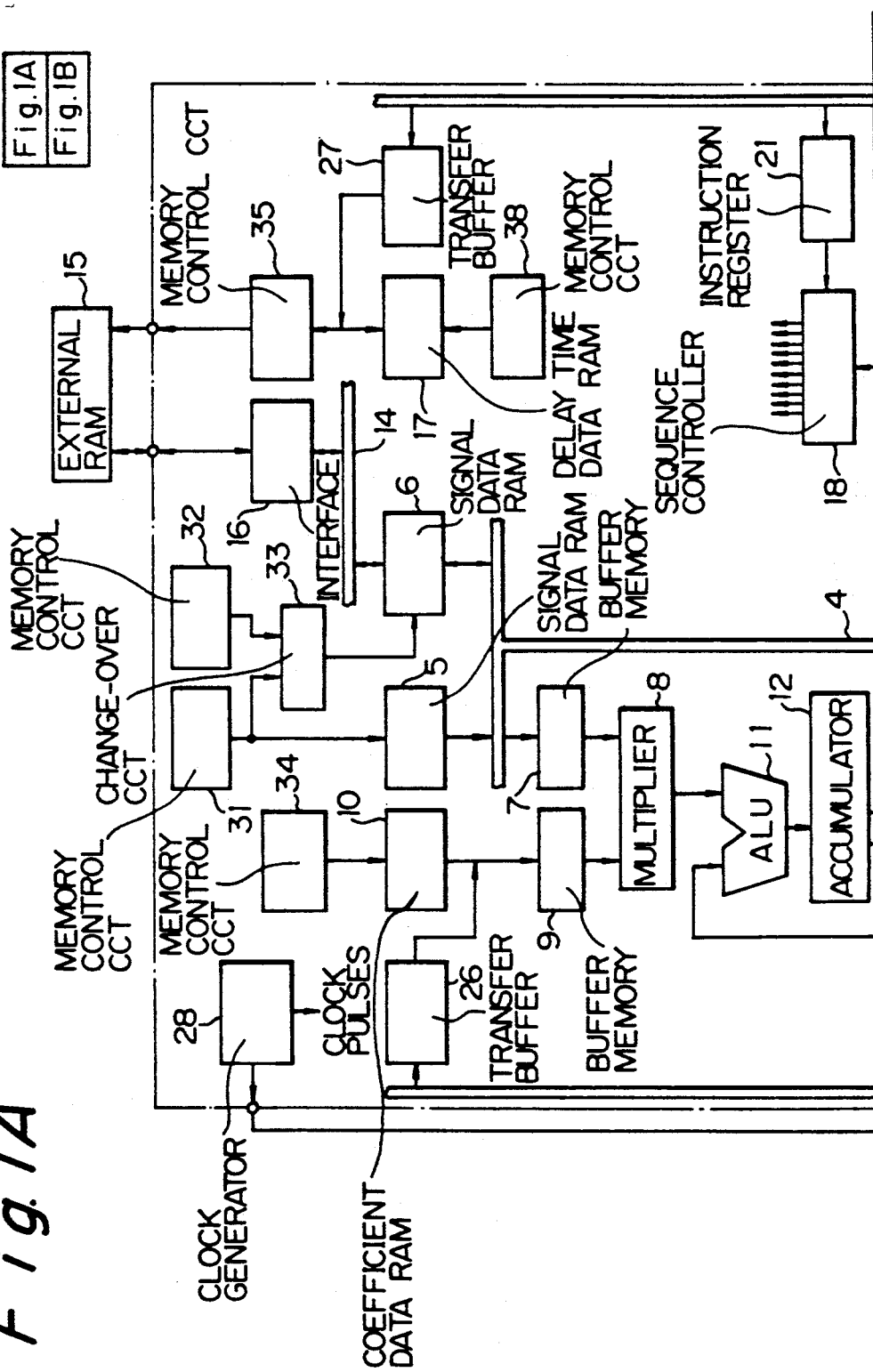

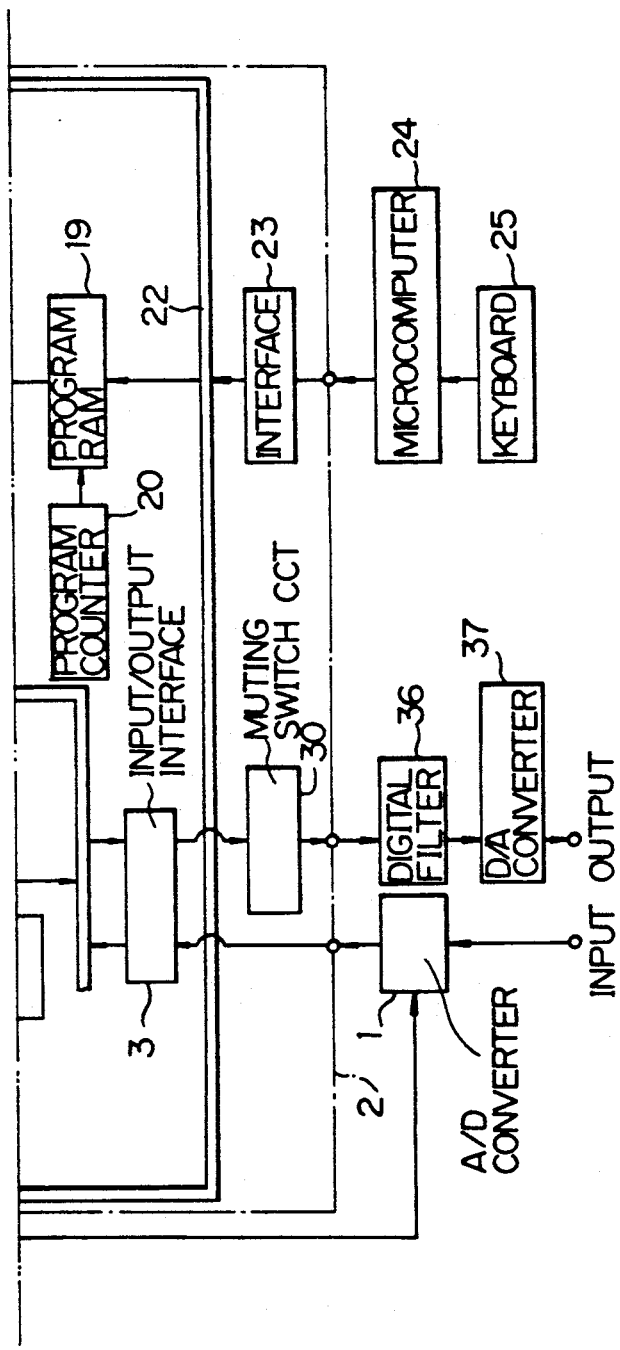

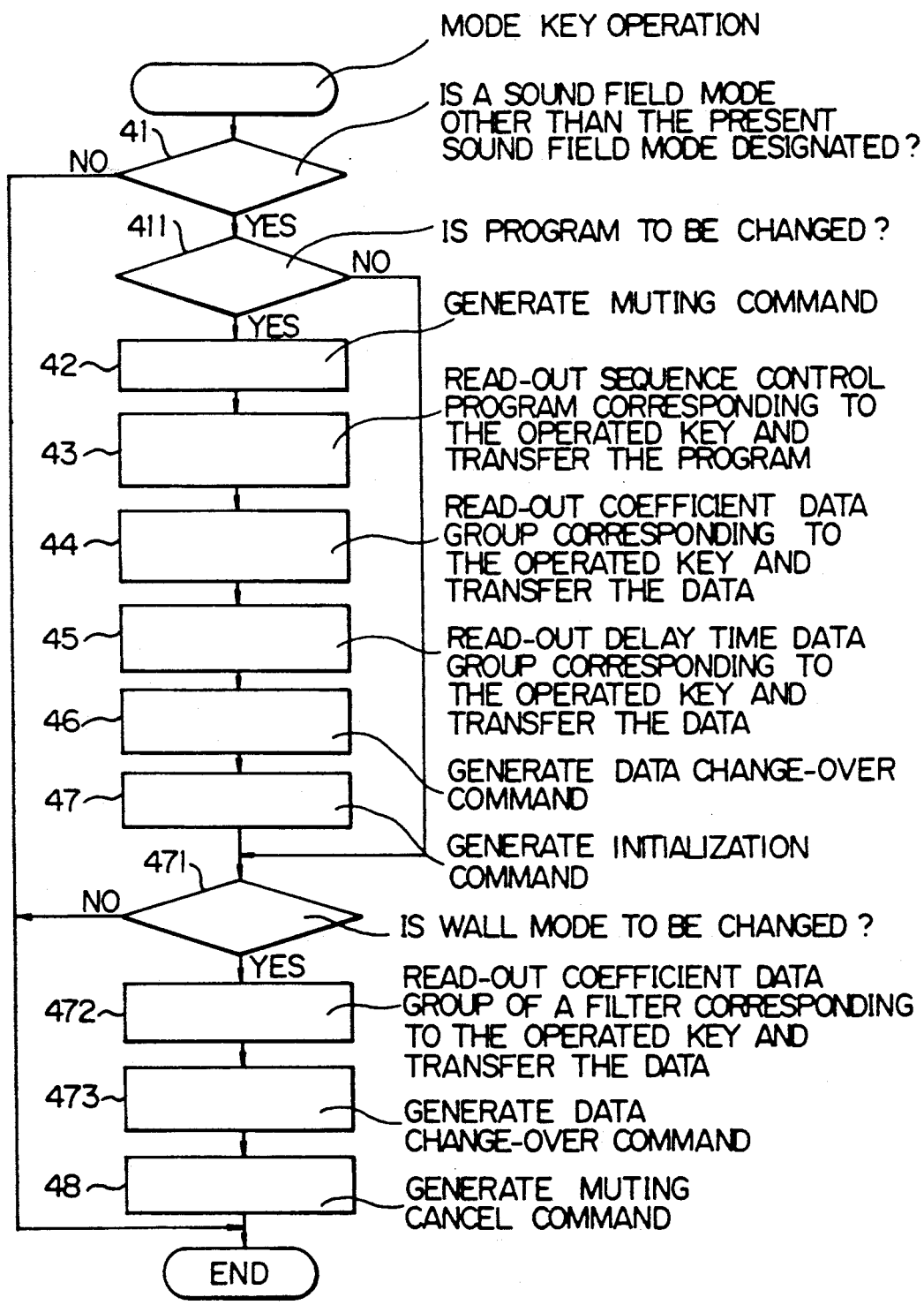

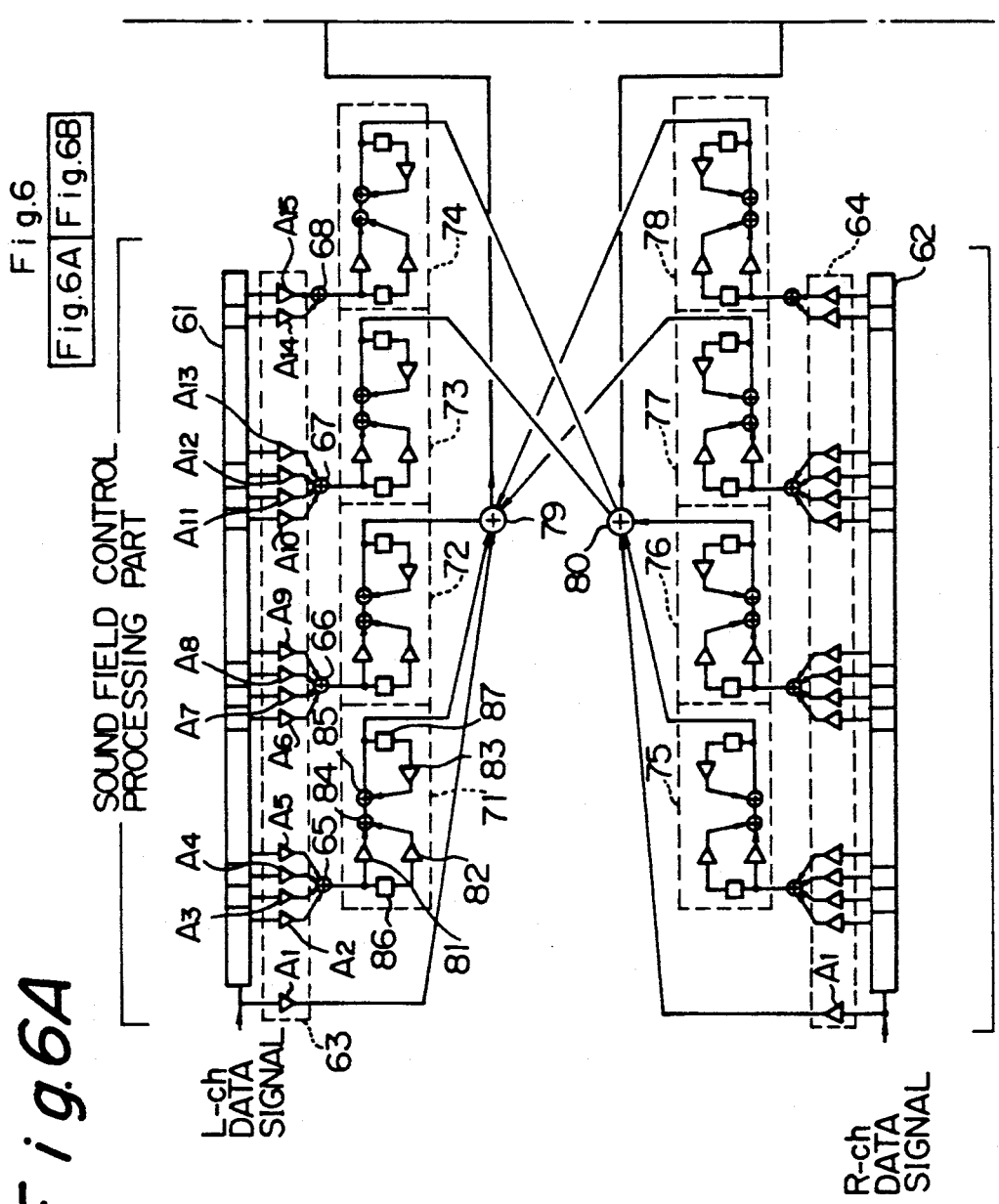

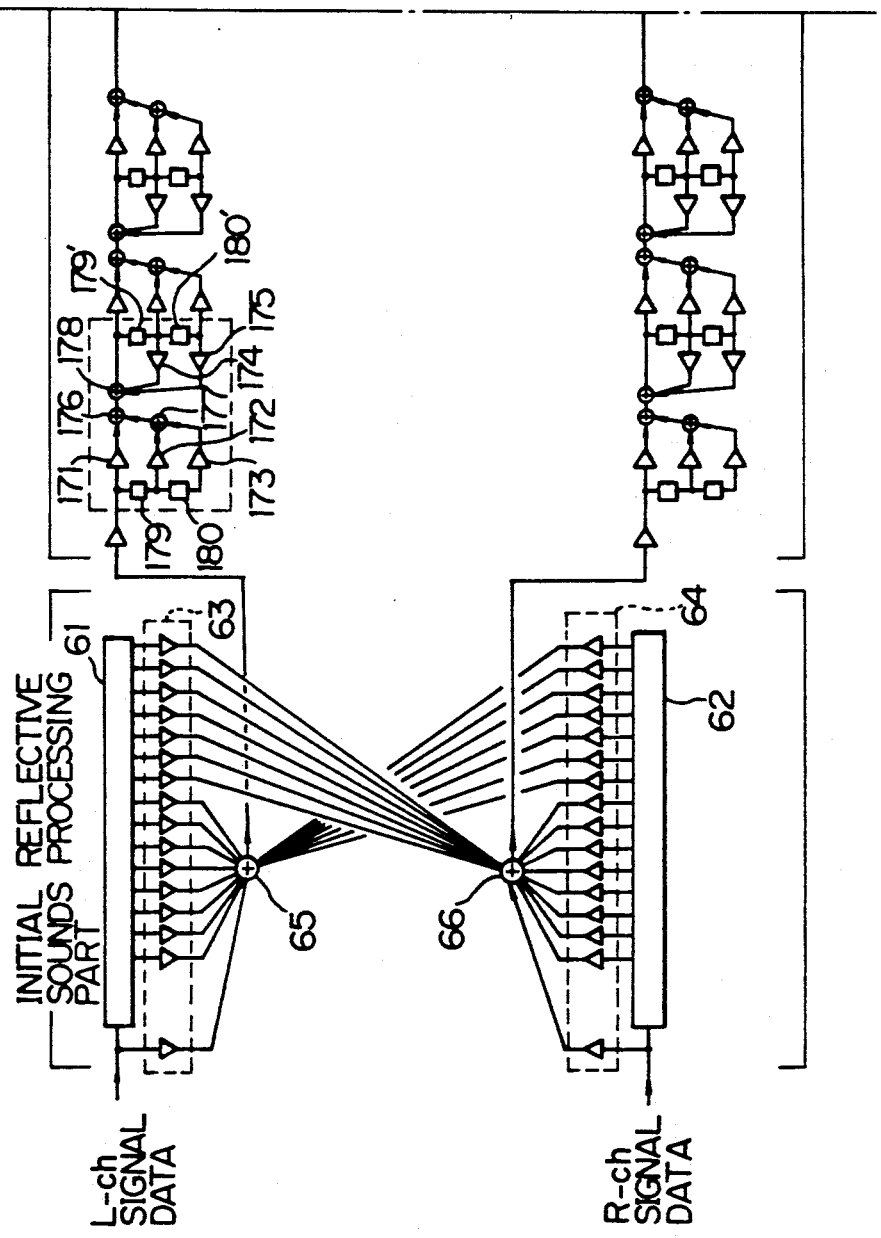

AUDIO SIGNAL DATA PROCESSING SYSTEM

BACKGROUND OF THE INVENTION

1. Field of the Invention

The present invention relates to an audio signal data processing system.

2. Description of Background Information

There are known audio signal data processing systems capable of controlling the sound field by which concert-hall (or theater) acoustics with reverberation sounds and presence, for example, are created in a listening room or in an automobile. An example of such a audio data processing system is disclosed in Japanese Patent Application Laid Open No. 64-72615. In such audio signal processing systems, a DSP (digital signal processor) is provided for controlling the sound field by digitally processing an audio signal output from an audio signal source such as a tuner.

The DSP is generally equipped with an arithmetic unit for executing operations such as the operations of the four rules of arithmetic, a data memory for storing the audio signal data to be supplied to the arithmetic unit, and a coefficient memory for storing coefficient data to be multiplied by the signal data stored in the data memory. Moreover, the DSP is configured so that an external memory for delaying the signal data can be connected from outside the system. Furthermore, the DSP is equipped with a delay time memory for storing delay time data indicating the time interval between the writing and reading of the signal data into and from the delay memory. In the DSP, the structure is such that the signal data is transferred between memories and also from a memory to the arithmetic unit in accordance with predetermined programs, in order that a calculating process for the signal data can be repeatedly executed at high speed. For example, an acoustic field is created by generating data from reflected sounds in consideration of the level attenuation in the following manner. At first the incoming signal data is transferred to the delay memory to delay the signal data so that delayed signal data is produced. Then the delayed signal data is transferred, via the data memory, to the arithmetic unit where the delayed signal data is multiplied by the coefficient data.

The coefficient data and the delay time data are rewritten by new data every time the sound field mode is changed by a manual operation, such new data being supplied from a microcomputer provided external to the DSP. With DSP the constructed in this way, a variety of acoustic fields can be created.

However, there has been a problem as follows. Since the frequency spectrum of the actual reflective sound changes depend on the wall material, so that an acoustic field which is equivalent to the actual sound field cannot always be obtained.

On the other hand, the program to be executed in the DSP is written in a rewritable memory such as the RAM in the DSP, and changed by the microcomputer external to the DSP every time the sound field mode is switched over by manual operation. By changing the program, various sound fields can be created.

In conventional DSPs, a circuit for controlling writing and reading addresses is constructed as shown in FIG. 7. This control circuit is used for controlling a delay memory for delaying 24-bit signal data, which is constituted by two dynamic RAMs each having 64K×4 bits. In this control circuit, a delay time data RAM 161 stores delay time data. The delay time data is provided for each access (reading/writing) of signal data, and the difference between delay time data for reading and delay time data for writing represents the delay time. A register 162 is connected to the delay time data RAM 161, and the delay time data read-out from the RAM 161 is held therein. The control circuit includes a rewritable register 163 holding ring length data i.e. data representing the maximum delay time. The delay time data and the ring length data are 14-bit data. The data from the registers 162 and 163 are supplied to a subtractor 164 where a modulo subtraction between the ring length data and the delay time data is performed. The result of the subtraction is used as base address data during the access to the delay RAM.

The modulo subtraction is performed as follows. If the delay time data is equal to zero, base address data is determined to be equal to the ring length data. If, on the other hand, the delay time data is not equal to zero, the base address data is determined to be equal to a value obtained by decreasing the delay time data by 1.

The result of modulo subtraction is transferred to the delay time data RAM 161, to be used as the delay time data in the next sampling period. In other words, the delay time data is varied by ring counting within the ring length data while being decremented at each sampling interval.

In delay memory access circuit 165 to which data of the subtractor 164 is output, access to the delay memory is performed by a so-called "page mode". For explanatory purposes, the high-order six bits of the output data from the subtractor 164 are denoted by [BAH], and the low-order eight bits of the output data of the subtractor 164 are denoted by [BAL]. The delay memory access circuit 165 is configured to add two bits "00" to [BAH], thereby producing 00[BAH] which is to be used as the base address data. As shown in FIG. 8, the [BAL] is supplied as a row address to the address terminal of the delay memory in synchronism with the falling edge of a $\overline{RAS}$ (Row Address Strobe) signal in the delay memory access circuit 165. Similarly, the 00[BAH] is supplied as a column address to the address terminal of the delay memory at the time of the first falling edge of a $\overline{CAS}$ (Column Address Strobe) signal within one sampling period. Furthermore 01 [BAH] is supplied at the time of the second falling edge of the $\overline{CAS}$ signal, and 10[BAH] is supplied at the time of the third falling edge of the $\overline{CAS}$ signal. In short, two high-order bits of the column address are up-counted.

In the manner described above, the 24-bit signal data is delayed in the delay memory which is comprised of two dynamic RAMs each having 64K×4 bits.

However, in the conventional DSP described above, the number of times of access is three, and the two high-order bits of the column address will not become "11". This means that one fourth of the total capacity of the delay memory is not used at all. Because of this reason there is the problem that the maximum delay time is limited to be less than the ultimate value.

The dynamic RAM of 64K×4 bits has a refresh cycle of 4 milliseconds. If all of 256 row addresses are not accessed in this time period, the correctness of stored contents can not be assured. Since the number of row address during the access of 24-bit signal data is "1", the number of row addresses which can be accessed at a rate of one reading/writing time per 4 milliseconds becomes equal to 128 (4 milliseconds ÷ (1/32 KHz))

when the conventional DSP is operated at a sampling frequency of 32 KHz. Thus, there is the problem that only half of the 256 row addresses are accessed under the above-condition.

Practically, there are several reading/writing cycles in each sampling period, and the memory can be refreshed if a certain condition is assigned to the delay time data. However, this solution imposes some limitation in the delay time which can be obtained. Therefore, the conventional DSP suffers a deficiency in handling data.

Furthermore, the audio data signal processing system generally is provided with an A/D converter for converting the incoming analog audio signal to digital audio signal data to be supplied to the DSP. However, there is the problem that off-set adjustment of the A/D converter must be performed thoroughly so that the output data of the A/D converter becomes conversion data for the incoming audio data with respect to a reference value.

OBJECT AND SUMMARY OF THE INVENTION

An objective of the present invention is to provide an audio signal data processing system which is able to approximate the reproduced sound field to the actual sound very precisely.

Another objective of the present invention is to provide an audio data signal processing system in which the whole memory capacity of the delay memory is utilized without any loss, to secure a longer delay time, and in which the delay memory is refreshed sufficiently.

A further objective of the present invention is to provide an audio signal data processing system which is configured so that the execution of off-set adjustment of the A/D converter becomes unnecessary.

According to the present invention, the audio signal data processing system comprises and input unit for sequentially supplying incoming audio signal data, a data memory control unit for writing and reading-out the audio signal data into and from a data memory, a delay memory control unit for sequentially reading-out the audio signal data from the data memory and storing the data in a location of a delay memory indicated by a writing address and for reading-out the audio signal data from a location of the delay memory indicated by a reading address and writing the data into the data memory, an address designating unit for designating the writing and reading addresses, a coefficient memory for storing coefficient data, a coefficient memory control unit for sequentially reading-out the coefficient data from the coefficient memory, an arithmetic unit for multiplying the coefficient data by the audio signal data having been read-out by the delay memory control unit and written into the data memory and summing up the results of the multiplication, and an output unit for forwarding the audio signal data in accordance with the result of the summing operation by the arithmetic unit, wherein the arithmetic unit includes a reading unit for reading-out the audio signal data from the data memory in an order according to the order of writing, a plurality of multiplication and summing unit for multiplying coefficient data by the audio signal data for each of the data groups which are obtained by grouping a predetermined number of the audio signal data read-out by the reading unit sequentially in the order of reading and subsequently summing up the multiplied values, a filter means for executing a filter characteristic operation for calculated values respectively obtained by each of the multiplication and summing unit, and a summing unit for summing up values obtained by the filter, and wherein the filter characteristic of the filter is made adjustable.

According to another aspect of the present invention, the audio signal data processing system comprises an input for sequentially supplying incoming audio signal data, a data memory control unit for writing and reading-out the audio signal data into and from a data memory, a delay memory control unit for sequentially reading-out the audio signal data from the data memory and storing the data in a location of a delay memory indicated by a writing address and for reading-out the audio signal data from a location of the delay memory indicated by a reading address and writing the data into the data memory, an arithmetic unit for multiplying predetermined coefficient data by the audio signal data written into the data memory, and an output means for forwarding the audio signal data in accordance with the result of the arithmetic operation by the arithmetic unit, wherein the delay memory control unit includes a ring counter means for performing a counting operation with the number of bits of address data at sampling intervals, a unit for designating delay time data for writing and reading operations, a summing unit for adding up the delay time data and count data of the ring counter, a multiplier means for multiplying data representing the number of accessing times required for accessing one word data for the delay memory to an output data of the summing unit, to provide base address data, and a setting unit for setting the writing or reading address in accordance with the base address data.

According to a further aspect of the present invention, the audio signal data processing system comprises an input for sequentially supplying incoming audio signal data, a data memory control unit for writing and reading-out the audio signal data into and from a data memory, a delay unit for sequentially reading-out the audio signal data from the data memory and storing the data in a delay memory and subsequently reading-out the audio signal data sequentially from the delay memory and writing the data into the data memory, an arithmetic unit for multiplying predetermined coefficient data by each sample data of the audio signal data written into the data memory and accumulating the multiplied values, and an output means for forwarding the audio signal data in accordance with the result of the arithmetic operation by the arithmetic unit, wherein the arithmetic unit is adapted to perform an operation constituting a high-pass filter characteristic with respect to predetermined sampled data.

BRIEF DESCRIPTION OF THE DRAWINGS

FIGS. 1a and 1b are a block diagram showing an embodiment of the present invention;

FIGS. 3 and 9 are flowcharts showing the operation of a microcomputer, in the system shown in FIG. 1;

FIGS. 6A and 6B are diagrams showing an equivalent circuit which performs the same operations as the processing operations of the DSP, and FIG. 6 is a diagram showing the arrangement of FIGS. 6A and 6B;

FIGS. 13A and 13B are diagrams showing an equivalent circuit performing an operation the same as the processing operation of the DSP in the third embodiment;

FIG. 13 is a diagram showing the arrangement of FIGS. 13A and 13B; and

DETAILED DESCRIPTION OF PREFERRED EMBODIMENTS

Figure 2:
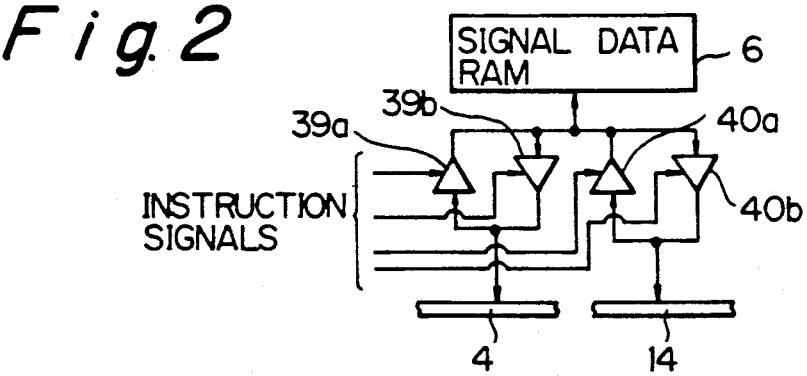
FIG. 2 is a circuit diagram particularly showing a part of the system shown in FIG. 1.

The embodiments of the present invention will be explained with reference to the accompanying drawings.

In the audio signal data processing system shown in FIG. 1 as an embodiment of the present invention, incoming analog audio signals are supplied to an input/output interface 3 in a DSP (digital signal processor) 2 through an A/D converter 1. A first data bus 4 is connected to the input/output interface 3. As a data memory for storing the audio signal data, two signal data RAMs 5 and 6 are connected to the first data bus 4. A buffer memory 7 is further connected to the data bus 4, and the output-data of the buffer memory 7 is connected to one of two inputs of a multiplier 8. A buffer memory 9 for holding the coefficient data is connected to the other input of the multiplier 8. A coefficient data RAM 10 for storing a plurality of coefficient data is further connected to the buffer memory 9. An ALU (arithmetic logic unit) 11 is provided for executing operations such as the accumulation of the calculation output of the multiplier 8 which is supplied to one of two inputs of the ALU 11. An accumulator 12 is provided for holding the calculation output of the ALU 11, and its output is connected to the other input of the ALU 11. The output of the accumulator 12 is connected to the data bus 4.

A memory control circuit 31 is connected to the signal data RAM 5. The memory control circuit 31 generates a control signal for controlling the writing of data into a designated address of the RAM 5 and reading of data from a designated address of the RAM 5. A memory control circuit 32, like the memory control circuit 31, is connected to the signal data RAM 6 via a change-over circuit 33. The change-over circuit 33 is configured to switch its operation between writing data into the designated address of the RAM 6 and reading-out data from the designated address in response to the control signal from the memory control circuit 31. A memory control circuit 34, like the memory control circuit 31, is connected to the coefficient data RAM 10.

The signal data RAM 6 is also connected to a second data bus 14 which is independent from the first data bus 4. Specifically, there are provided a couple of tri-state buffers 39a and 39b between the signal data RAM 6 and the first data bus 4 and a couple of tri-state buffers 40a and 40b between the signal data RAM 6 and the second data bus 14, as illustrated in FIG. 2. The buffers 39a, 39b, 40a and 40b are respectively on-off controlled in response to instruction signals from a sequence controller which will be described later. For writing the signal data from the first data bus 4 into the RAM 6, the buffer 39a turns on, and the buffer 39b turns on when the signal data is read-out from the RAM 6 to the first data bus 4. Similarly, for writing the signal data from the data bus 14 into the RAM 6, the buffer 40a turns on, and the buffer 40b turns on when the signal data is read-out from the RAM 6 to the second data bus 14. Thus, one of the tri-state buffers 39a, 39b, 40a, and 40b, which are controlled by instruction signals, is always turned on.

An interface 16 for data transfer to and from an external RAM 15 is connected to the data bus 14. The external RAM 15, which is a memory for the delay operation, is provided for producing delay signal data of the audio signal data, and is capable of producing signal data whose delay time is dependent on the memory capacity. A memory control circuit 35 is provided for designating writing and reading addresses of the RAM 15, and a delay time data RAM 17 is connected to the memory control circuit 35. The operations of writing and reading of the delay time data into and from the RAM 17 are controlled by a memory control circuit 38.

Operations of the interfaces 3 and 16, multiplier 8, buffer memories 7 and 9, ALU 11, accumulator 12, memory control circuits 31, 32, 34, 35 and 38, and change-over circuit 33 are controlled by the sequence controller 18. A program RAM 19 is connected to the sequence controller 18, and the sequence controller operates in accordance with the program stored in the program RAM 19. A program counter 20 is connected to the program RAM 19, and every time the count value of the program counter 20 is incremented, an instruction code of the step corresponding to the new count value is read-out from the program RAM 19 and supplied to the sequence controller 18. To the sequence controller 18, there is also connected a register 21 for holding a plurality of commands from a microcomputer 24 described later.

The program RAM 19 and the register 21 are respectively connected to a main bus 22. The microcomputer 24 is connected to the main bus via an interface 23. Transfer buffers 26 and 27 are connected to the main bus 22. The transfer buffer 26 temporarily holds the coefficient data supplied from the microcomputer 24 for storage in the RAM 10. The transfer buffer 27 temporarily holds the delay time data supplied from the microcomputer 24 for storage it in the RAM 17.

The microcomputer 24 is constituted by a microprocessor, RAM, ROM, and an interface (not shown). A keyboard 25 is connected to the microcomputer 24. The keyboard 25 is provided with a plurality of keys such as a plurality of mode keys for respectively designating a sound field mode, e.g. "hall 1", "hall 2" having different sound field characteristics, a frequency band setting key for controlling a graphic equalizer function, a level adjusting key, and a muting key (not shown). In the ROM of the microcomputer 24, various programs and data are previously written. Those programs and data are, namely, a plurality of sequence control programs to be processed by the sequence controller 18, in addition to a DSP control program which is processed by the microcomputer 24 itself, a plurality of coefficient data groups for an initial reflective sound level, and a plurality of coefficient data groups for the first to fourth filters, both to be supplied to the RAM 10, and a plurality of delay time data groups to be supplied to the RAM 17 for setting the reading address.

In the DSP 2, a clock generator 28 is provided, and clock pulses are supplied from the clock generator 28 to the sequence controller 18 and the program counter 20. The clock pulses generated by the clock generator 28 are also used as the timing signal of the A/D converter 1.

The audio signal data issued from the interface 3 is supplied to a muting switch circuit 30. When the muting switch circuit 30 is turned on, the audio signal data is supplied to the D/A converter 37 via a digital filter 36. The on-off control of the muting switch circuit 30 is performed by instruction signals issued from the sequence controller 18.

In the arrangement described above, the sequence controller 18 generates various instruction signals in addition to the instruction signals for the on-off control of the muting switch circuit 30. Those instruction signals are, an namely, instruction signal for transferring the coefficient data group held in the transfer buffer 26 to the RAM 10, an instruction signal for transferring the address data group held in the transfer buffer 27 to the RAM 17, a transfer instruction signal for transferring the audio signal data from the interface 3 to the designated address of the signal data RAMs 5 and 6, an instruction signal for reading-out the signal data from the designated address of the signal data RAM 5 and 6 and transferring it to the buffer memory 7, an instruction signal for reading-out the coefficient data from the designated address of the RAM 10 and transferring it to the buffer memory 9, an instruction signal for instructing various operations of the ALU 11, a transfer instruction signal for transferring the signal data held in the accumulator 12 to the designated address of the RAMs 5 and 6 or to the buffer 7, a transfer instruction signal for transferring data from the designated address of the signal data RAM 6 to the designated writing address of the external RAM 15, a transfer instruction signal for transferring data from the designated delay address of the external RAM 15 to the designated address of the signal data RAM 6, and a reset instruction signal for the external RAM 15, a transfer instruction signal for transferring data from the designated delay address of the external RAM 15 to the designated address of the signal data RAM 6, and a reset instruction signal for initializing the RAMs 5 and 6 and the external RAM 15. These instruction signals are generated at appropriate times according to commands from the microcomputer 24 or the program stored in the RAM 19. Since the command from the microcomputer 24 is held in the command resister 21, the sequence controller 18 generates an instruction signal corresponding to the command from the microcomputer 24 by an interruption operation while monitoring the contents of the command register 21 during its operation according to the program. The command held in the command register 21 is canceled by the sequence controller 18 for example, when the corresponding instruction signal is generated.

When any one of the mode keys of the keyboard 25 is operated, as shown in FIG. 3 the microcomputer 24 judges whether or not the operated key is a key for designating a sound field mode different from the sound field mode presently selected (step 41). When a sound field mode different from the present sound field mode is designated, the microcomputer 24 judges whether or not a change of the sequence control program is required (step 411). If the change of the sequence control program is not required, the microcomputer 24 proceeds to step 471 which will be described later. On the other hand, if the change of the sequence control program is required, the microcomputer 24 supplies the muting control instruction to the sequence controller 18 in order to turn off the muting switch circuit 30 immediately for placing the system in a muting stage (step 42). Then the microcomputer reads a sequence control program corresponding to the operated key, a coefficient data group $a_1, a_2, \ldots a_n$, and a delay time data group $t_1, t_2, \ldots t_n$ from the ROM, and transfers them to the DSP 2 (steps 43 through 45). The sequence control program is transferred to the RAM 19 through the interface 23 and the main bus 22, and written in the RAM 19 by a memory writing control circuit (not shown). The coefficient data group is transferred to the transfer buffer 26 through the interface 23 and the main bus 22. The delay time data group is transferred to the transfer buffer 26 through the interface 23 and the main bus 22. After transferring the coefficient data and the delay time data to the transfer buffers 26 and 27 respectively, the microcomputer 24 issues a data change-over command to the sequence controller 18 (step 46). Furthermore, the microcomputer 24 issues an initialization command to the sequence controller 18 (step 47). In response to the data change-over command, the sequence controller 18 issues a predetermined instruction signal to the memory control circuits 34 and 38, to write the coefficient data group transferred to the transfer buffer 26 into a predetermined area of the RAM 10 and to write the delay time data group transferred to the transfer buffer 27 into a predetermined area of the RAM 17. Furthermore, since the sequence controller 18 issues the above-mentioned reset instruction signal to the memory control circuits 31, 32, and 35 in response to the initialization command, "0" is written into the whole memory areas of the RAMs 5 and 6, and the external RAM 15 by means of the memory control circuits 31, 32, and 35.

Figure 4:
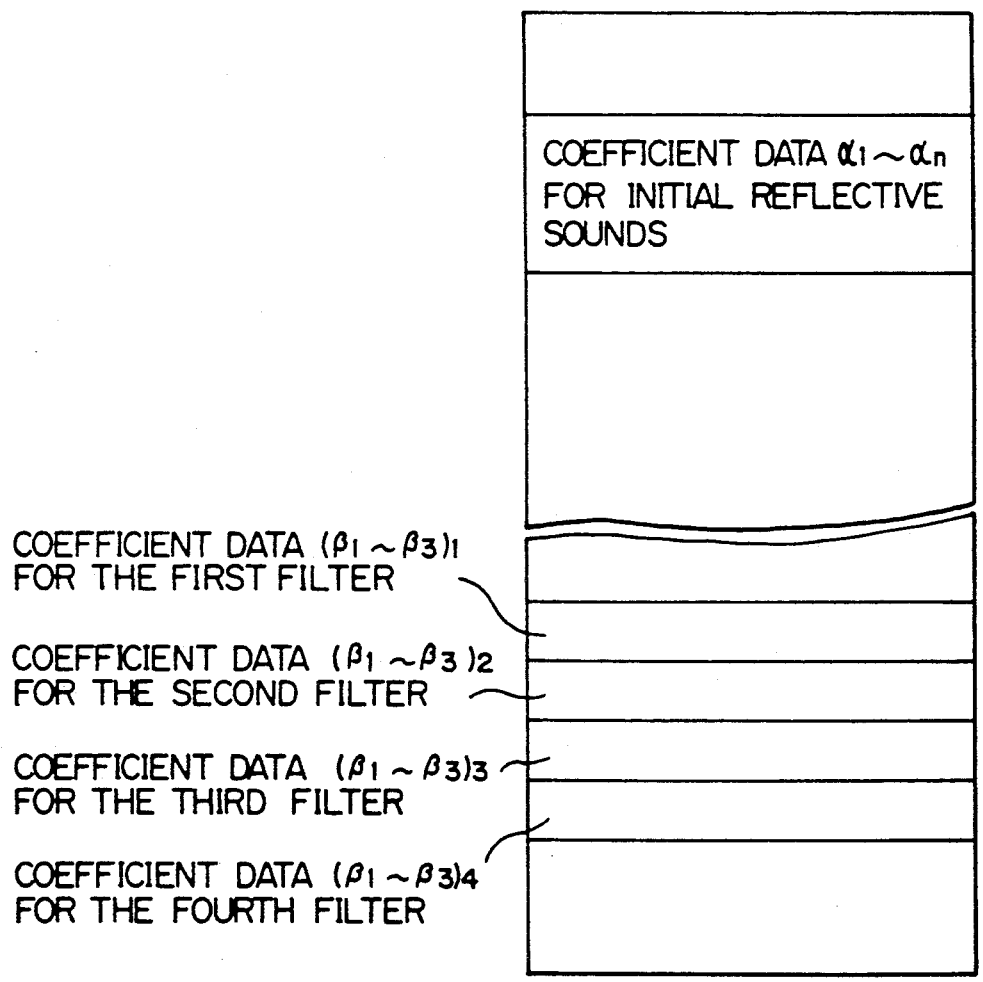
FIG. 4 is a diagram showing the arrangement of memory locations of coefficient data in a coefficient data RAM.

The microcomputer 24 further judges whether or not the key operation in the operating part is a key operation requiring a change of the wall mode (step 471). If the change of the wall mode is required, the microcomputer 24 reads-out from the ROM coefficient data groups $(\beta_1) \beta_2 \ldots \beta_m)_1 \ldots (\beta_1, \beta_2 \ldots \beta_m)_4$ of the first to fourth filters corresponding to the operated key, and transfers them (step 472). The first filter has a frequency characteristic corresponding to the change in sound pressure of a sound wave once reflected by the wall. The second filter has a frequency characteristic corresponding to the change in sound pressure of a sound wave twice reflected by the wall. The third filter has a frequency characteristic corresponding to the change in sound pressure of a sound wave reflected by the wall three times. Similarly, the fourth filter has a frequency characteristic corresponding to the change in sound pressure of a sound wave reflected by the wall four times. In addition, the value of m is 3, for example. The coefficient data groups of the filters are also transferred to the transfer buffer 26 through the interface 23 and the main bus 22. After transferring the coefficient data to the transfer buffer 26, the microcomputer 24 issues a data change-over command to the sequence controller 18 (step 473), to write the coefficient data groups of the filters into predetermined locations of the RAM 10. In the RAM 10, the coefficient data groups of the initial reflective sound levels and the coefficient data groups of the four filters are stored in different locations, a shown in FIG. 4.

After the execution of the step 473, the microcomputer 24 issues a muting cancel command to the sequence controller 18, to turn-on the muting switch circuit 30 thereby canceling the muting state (step 48). More specifically, the muting switch circuit 30 is turned off only during the period required for changing data or program in the RAM 10, 17 and 19 in order to switch from the present sound field mode to another sound field mode. This function is provided for preventing the generation of noise signals by the change of data or program.

Next, the signal data processing operation within the DSP 2 will be explained. The incoming audio signal supplied to the A/D converter 1 is converted to an audio signal data group $d_1, d_2, \ldots d_n$ at each of sampling times synchronized with clock pulses from the clock generator 28. The audio signal data group is supplied to the first data bus 4 via the interface 3. The signal data group supplied to the data bus is in turn supplied to the RAM 5 or 6, and stored therein.

The signal data written in the RAM 6 is sequentially transferred to an output register (not shown) in the interface 16 via the data bus 14, and from the output register, further written into memory locations of the external RAM 15 designated by the writing address. The writing address is controlled by the memory control circuit 35, and one of a plurality of addresses whose number corresponds to the number of memory locations of the external RAM 15 is sequentially selected in a predetermined order each time the transferred signal data is supplied. In the external RAM 15, the signal data is the memory location designated by the reading address is read-out, and transferred to an input register (not shown) in the interface 16. Since the delay time data stored in the RAM 17 is read-out by the memory control circuit 38 and supplied to the memory control circuit 35, the reading address is set according to the delay time data supplied to the memory control circuit 35, using the writing address as a reference. In other words, the interval between the timing of writing signal data into the RAM 15 and the timing of reading the same signal data becomes a delay time designated by the delay time data. The signal data transferred to the input register in the interface 16 and held therein is in turn transferred to the signal data RAM 16 via the data bus 14. Delay audio signal data for controlling the sound field is produced by the transfer operation with the external RAM 15 described above.

The coefficient data read-out from the RAM 10 is supplied to the buffer memory and held therein. At times appropriately determined by the sequence controller 18, the signal data is transferred to the buffer memory 7 from the RAM 5 or 6, or the accumulator 12. Therefore, the multiplier 8 executes multiplication between the signal data held in the buffer memory 7 and the coefficient data held in the buffer memory 9. In the case of computing a sum of products between a signal data group $d_1, d_2, \ldots d_n$ and the coefficient data group $\alpha_1, \alpha_2 \ldots \alpha_n$ example, the following operations will be performed. At first, $d_1$ is held in the buffer memory 7 for transmission, $\alpha_1$ is held in the buffer memory 9 for transmission, $\alpha_1 \cdot \alpha_1$ is calculated in the multiplier 8, and "0" is added to $\alpha_1 \cdot d_1$ at the ALU 11. The result of this operation is held in the accumulator 12. Subsequently, $d_2$ is held in the buffer memory 7 for transmission, and $\alpha_2$ is held in the buffer memory 9 for transmission. At this time $\alpha_2 \cdot d_2$ is calculated in the multiplier 8, $\alpha_1 \cdot d_1$ is issued from the accumulator 12, and $\alpha_1 \cdot d_1 + \alpha_2 \cdot d_2$ is calculated in the ALU 11. By repeating these operations, $$\sum_{i=1}^{n} ai \cdot di$$

is calculated.

Figure 5:
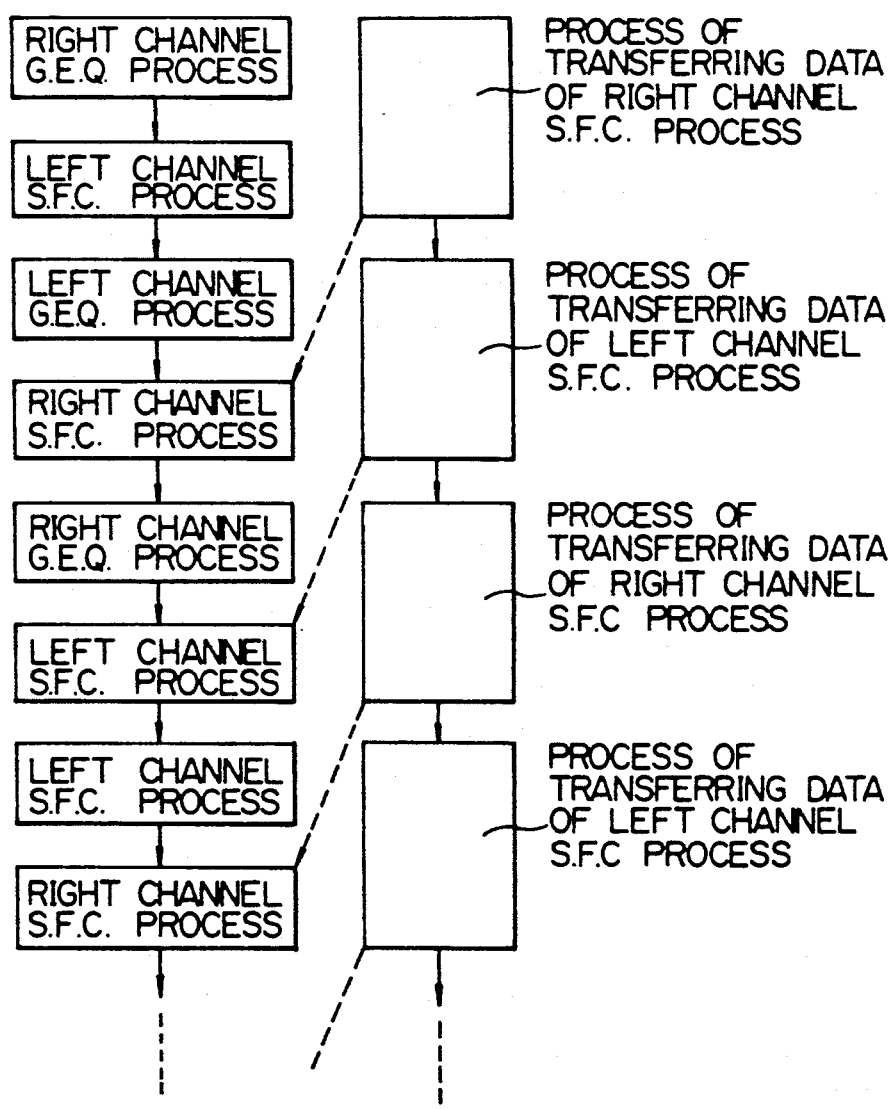
FIG. 5 is a diagram showing the order of processing operations.

As shown in FIG. 5, the signal processing operation is repeated in the following order: a graphic equalizing (G.E.Q.) process (process of a graphic equalizer) for the right channel, the sound field control process for the left channel, the graphic equalizing process for the left channel, and the sound field control process for the right channel. These four processes are performed by using the first data bus 4. On the other hand, the above-described process of producing the delay audio signal data is performed in parallel with the graphic equalizing process and the sound field control process. Specifically, as shown in FIG. 5, during the graphic equalizing process of the right channel and the sound field control process of the left channel, the delay audio signal data for the sound field control process of the right channel is transferred from the external RAM 15 to the signal data RAM 16 by means of the second data bus 14. Also, during the graphic equalizing process of the left channel and the sound field control process of the right channel, the delay audio signal data for the sound field control process of the left channel is transferred from the external RAM 15 to the signal data RAM 16 by means of the second data bus 14.

Figure 6B:
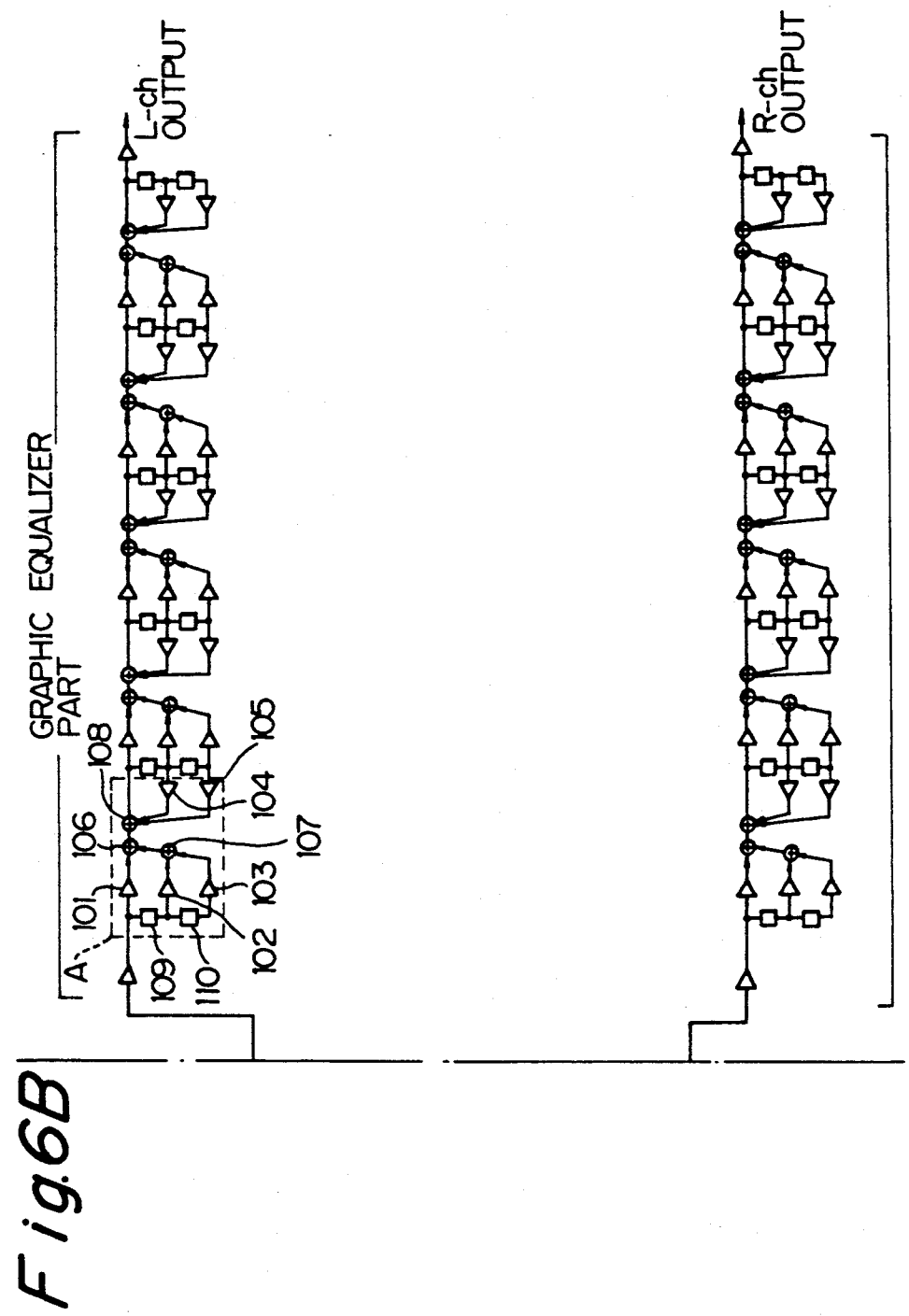
Figure 7:
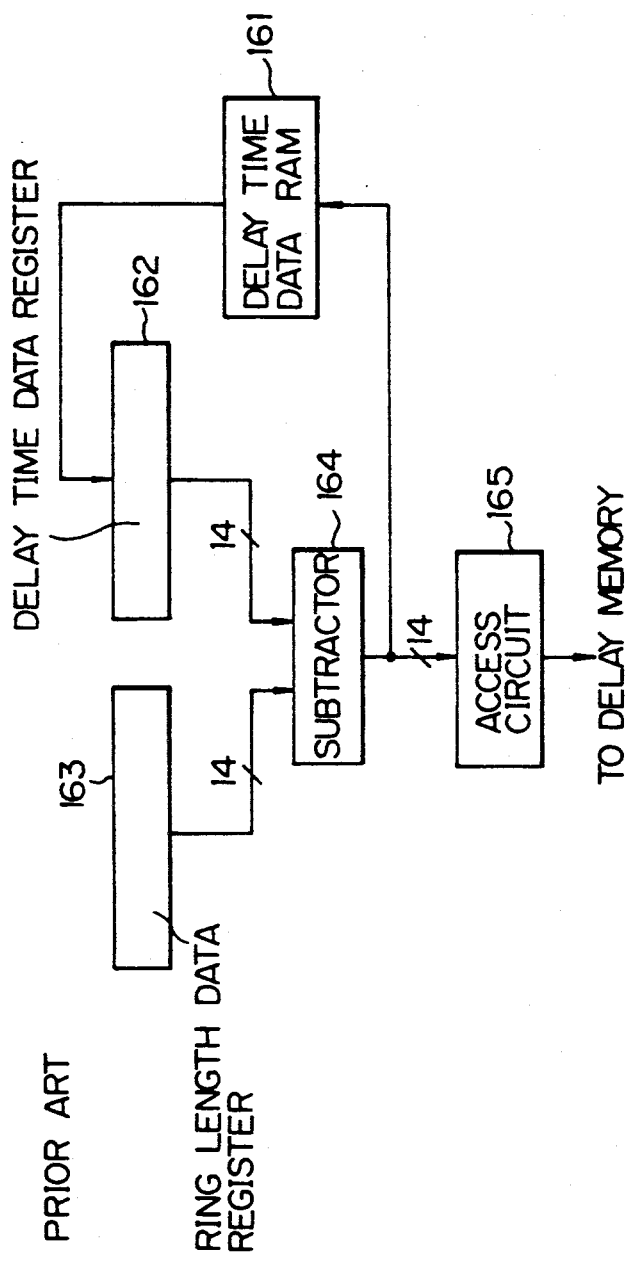
FIG. 7 is a block diagram showing a conventional control circuit for the delay memory.
Figure 8:
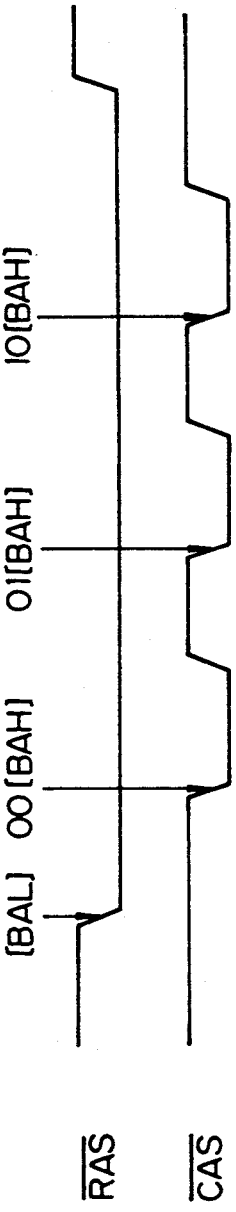
FIG. 8 is a diagram showing the access operation of an access circuit in the circuit shown in FIG. 7.
Figure 10:
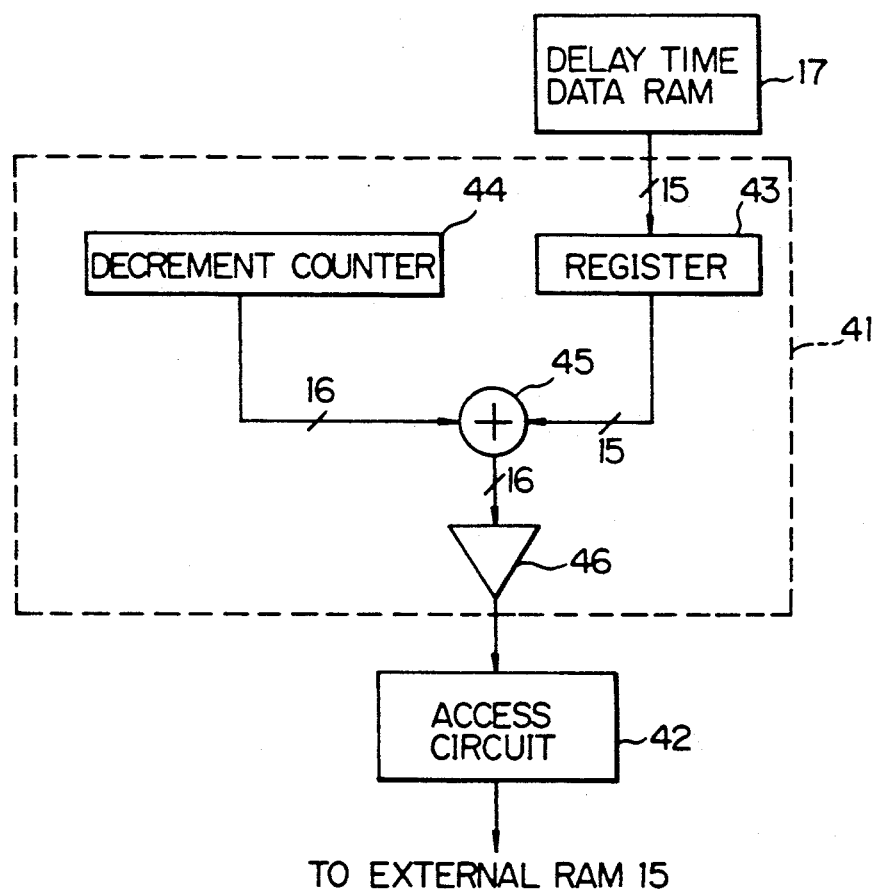
FIG. 10 is a block diagram showing the construction of a memory control circuit for the external RAM in the system shown in FIG. 1.

An equivalent network for performing operations the same as the sound field control operations described above will be explained. The equivalent network is constructed as shown in FIGS. 6A and 6B. In FIG. 6A, digital delay circuits 61 and 62 perform the operations of generating the delay audio signal data of the left and right channels. Multiplying circuits 63 and 64 consisting of fifteen multipliers $A_1$ through $A_{15}$ for multiplying coefficients to perform the multiplication of the coefficients $\alpha_1$ through $\alpha_{15}$ by the signal data and the delay audio signal data. In the left channel, output data of the multipliers $A_2$ through $A_5$ are added up by an adder 65, and output data of the multipliers $A_6$ through $A_9$ are added up by an adder 66, the output data of the multipliers $A_{10}$ through $A_{13}$ are added up by an adder 67, and the output data of the multipliers $A_{14}$ and $A_{15}$ are added up by an adder 68. The outputs of the adders 65 through 68 are respectively connected to filters 71 through 74 provided as the first to fourth filters. The filter 71 is comprised of multipliers 81, 82, and 83 for multiplying coefficients, adders 84 and 85, and delay elements 86 and 87. The delay time of the delay elements 86 and 87 corresponds to a time period of one step of the sequence control program which is generated as held in the accumulator 12. In the multiplier 81, a coefficient $\beta_3$ is multiplied by the data supplied from the adder 65, and the result of multiplication is delayed by the delay element 86 for the period of one step, and supplied to the multiplier 82. The multiplier 82 multiplies the coefficient $\beta_2$ by the supplied data. The output data of the multipliers 81 and 82 are added to each other by the adder 84. The summing output signal of the adder 84 is supplied to the adder 85, in which it is added to the output data of the multiplier 83. The output data of the adder 85, to be used as the output signal of the filter 71, is delayed for one step period by means of the delay element 87, and in turn supplied to the multiplier 83. The multiplier 83 multiplies the coefficient $\beta_1$ by the supplied data. The filters 72 through 74 are constructed in a similar manner as the filter 71. In the right channel, filters 75 through 78, which are constructed as the filter 71, are provided as the first to fourth filters as in the left channel.

The output data of the multiplier $A_1$, the filters 71 and 72 of the left channel and of the filters 77 and 78 of the right channel are added together by the adder 79, and the summed data is supplied to a graphic equalizer part of the left channel. The output data of the multiplier $A_1$, the filters 75 and 76 of the left channel and of the filters 73 and 74 of the right channel are added together by the adder 80, and the summed data is supplied to a graphic equalizer part of right channel.

By means of the variable frequency characteristics of the filters 71 through 78 described above, the frequency characteristic of the audio signal data is adjusted in consideration of the number of reflections of the reflective sound groups of the audio signal data, while the audio signal data is divided into four groups.

In the case of graphic equalizer processing, coefficient data corresponding to the levels in each of the frequency bands of the left and right channels which have been previously set by key operations, are stored in the RAM 10. Upon calculation for each frequency band, the coefficient data is sequentially read-out from the RAM 10, and transferred to the buffer memory 9. On the other hand, the reading address of the RAM 5 is designated by the memory control circuit 31 at each execution step, and the signal data is read-out from the designated address and in turn transferred to the buffer memory 7 through the data bus 4.

As an example, the graphic equalizer operation of one frequency band is as follows. At first, the signal data $d_{12}$ is read-out from the address $12_H$ of the RAM 5 in the first step. The read-out signal data $d_{12}$ and coefficient data $\alpha_0$ which has been set are transferred to the buffer memories 7 and 9, and are multiplied with each other at the multiplier 8. To the result of the multiplication $\alpha_0 \cdot d_{12}$, "0" is added by the ALU 11 in the third step which is two steps after the first step, and the result of the addition is in turn held in the accumulator 12.

In the second step, the signal data $d_{11}$ is read-out from the address $11_H$ of the RAM 5. The read-out signal data $d_{11}$ and the coefficient data $\alpha_0$ having been set are multiplied with each other at the multiplier 8. To the result of the multiplication $\alpha_0 \cdot d_{11}$, the value held in the accumulator 12 (the result of addition in the third step) is added by the ALU 11 in the fourth step, and the result of the addition is in turn held in the accumulator 12. Then, in the third step, the value held in the accumulator 12 three steps before (the last calculation value of the one frequency band) $EQ_{n-1}$ is transferred to the address $10_H$ of the RAM 5 and to the buffer memory 7, and multiplied with the coefficient data $\alpha_0$ at the multiplier 8. To the result of the multiplication $\alpha_0 \cdot EQ_{n-1}$, the value held in the accumulator 12 (the result of the addition in the fourth step) is added by the ALU 11 in the fifth step, and the result of the addition is in turn held in the accumulator 12.

In the fourth step, the signal data $d_{14}$ is read-out from the address $14_H$ of the RAM 5. The read-out signal data $d_{14}$ and the coefficient data $\alpha_0$ having been set are multiplied with each other at the multiplier 8. To the result of the multiplication $\alpha_0 \cdot d_{14}$, the value held in the accumulator 12 (the result of addition in the fifth step) is added by the ALU 11 in the sixth step, and the result of the addition is in turn held in the accumulator 12. Then, in the fifth step, the signal data $d_{13}$ is read-out from the address $13_H$ of the RAM 5. The read-out signal data $d_{13}$ and the coefficient data $\alpha_0$ having been set are multiplied with each other at the multiplier 8. To the result of the multiplication $\alpha_0 \cdot d_{13}$, the value held in the accumulator 12 (the result of addition in the sixth step) is added by the ALU 11 in the seventh step, and the result of the addition is in turn held in the accumulator 12. In this way, the audio signal data for one frequency band of the graphic equalizer is obtained. Similar operations are performed for all the frequency bands having been set. Although not shown, a shifter circuit is provided in the output stage of the multiplier 8, and the result of multiplication by the multiplier 8 is supplied to the ALU 11 at appropriate time, In addition, the coefficient data $\alpha_0$ is not constant data.

An equivalent circuit which performs an operation identical with the graphic equalizer operation described above is shown as the graphic equalizer part in FIG. 6B. This graphic equalizer part is provided in the stage after the sound field control processing part, and is constituted by a series connection of a plurality of circuits respectively corresponding to each frequency band. The circuit for one frequency band is constituted, as indicated enclosed by the dashed line A, by multipliers 101 through 105 for multiplying the coefficient data $\alpha_0$, adders 106 through 108 for adding the outputs of the multipliers 101 through 105, and delay elements 109 and 110. The delay elements 109 and 110 are provided for obtaining a delay time which is generated while the signal is held in the accumulator 12 or the shifter circuit mentioned above, and the delay time of the delay elements 109 and 110 corresponds to the period of one step of the sequence control program. Therefore, the signal data supplied to the multiplier 102 is data one step before the signal data supplied to the multiplier 101, and the signal data supplied to the multiplier 103 is data one step before the signal data supplied to the multiplier 102. A similar time relation is present for the signal data supplied to the multipliers 104 and 105.

As specifically described in the foregoing, the audio signal data processing apparatus according to the present invention is configured such that the audio signal data is read-out from the data memory in a reading order corresponding to the order of writing, coefficient data is multiplied by each audio signal data in each of the data groups which have been obtained by sequentially grouping the read-out audio data for every predetermined number of data, the multiplied values are added together, an adjustable filter characteristic operation is executed for the sum of products in each of the data groups, and the values obtained by calculation are added together. Thus, initial reflective sound data can be arbitrarily obtained by the filter characteristic operation in consideration of variations of the frequency characteristic of actual sound waves reflected by the wall.

Figure 9:
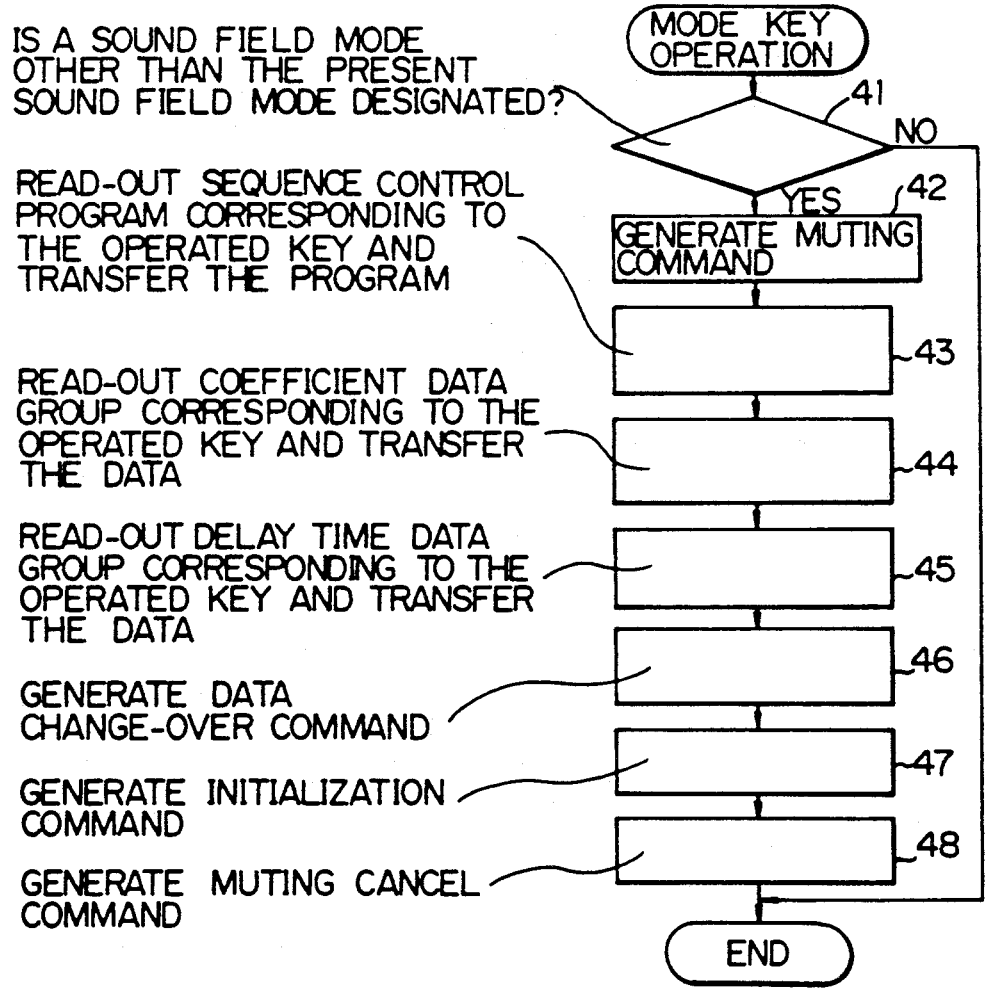

The second embodiment of the present invention will be described with reference to FIGS. 9 through 12 of the accompanying drawings. In this embodiment, the memory control circuit 35 is constituted by an address designating circuit 41 and an access circuit 42 which will be described later. Since other circuit elements are constructed in the same manner as those of the first embodiment, the explanation thereof will not be repeated. However, the operation of the microcomputer 24 in this embodiment shown in FIG. 9 is slightly different from the operation in the first embodiment, shown in FIG. 3. As shown in FIG. 9, if it is judged in step 41 that a sound field mode other than the present sound field mode is designated, the program directly proceeds to step 42 in which the muting command is issued. In addition, after the generation of the initialization command at step 47, the program directly proceeds to step 48 in which the muting cancel command is generated.

In addition, it is also possible to modify the operation of the apparatus as follows. Specifically, instead of generating the initialization command, the microcomputer 24 generates the reset instruction signal immediately after the sequence controller 18 generates instruction signals for transferring data to the RAMs 10 and 17 in response to the data change-over command.

Next, the memory control circuit 35 for controlling the external RAM 15 will be described. The external RAM 15 is comprised of two dynamic RAMs each having 64K×4 bits, and the delay of the 24-bit data signal is performed by accessing the external RAM 15 three times for one word in one sampling cycle. As shown in FIG. 9, a register 43 for holding the delay time data read-out from the delay time data RAM 17 is provided in an address designating circuit 41 in the memory control circuit 35. The delay time data is 15-bit data. The address designating circuit 41 is provided with a decrement counter 44. The decrement counter 44 is configured to decrement at each sampling interval and perform 16-bit ring counting while ignoring the borrow. An adder 45 is connected to the register 43 and decrement counter 44, and a multiplier 46 is connected to the adder 45. The multiplier 46 is configured to multiply the output data of the adder by a factor of 3, and this output data is supplied to the access circuit 42.

Specifically, the delay time data held in the register 43 and the count data of the decrement counter 43 are added together at the adder 45, and the summing value is trebled at the multiplier 46. During the summing and multiplying operations, the carry from the MSB (Most Significant Bit) of the 16-bit data is ignored. The output data of the multiplier 46 is used as the base address of the external RAM 15. Now, if the count data of the decrement counter 44 and the delay time data are denoted by DC and OD respectively, then the base address data which is denoted by BA will be expressed as follows:

$$BA = (DC + OD) \times 3 \qquad (1)$$

The delay time data OD has a constant value unless it is rewritten by the microcomputer 24. The subtraction from the count data DC is performed at sampling intervals.

The base address data BAn at an n-th sampling period and the base address data BAn+1 at an n+1-th sampling period are expressed as follows:

$$BAn = (DCn + OD) \times 3 \qquad (2)$$

$$BAn+1 = (DCn+1 + OD) \times 3 \qquad (3)$$

Since $DCn+1 = DCn - 1$, \qquad (4)

the equation (3) can be rewritten as follows:

$$\begin{aligned} BAn + 1 &= (DCn - 1 + OD) \times 3 \\ &= (DCn + OD) \times 3 - 3 \\ &= BAn - 3 \end{aligned} \qquad (5)$$

Therefore, the base address data is decreased by the amount of 3 addresses at each sampling interval.

Figure 11:
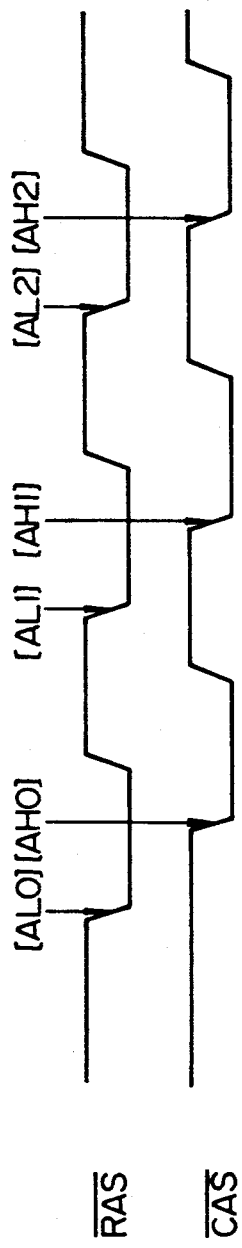
FIG. 11 is a diagram showing the access operation of an access circuit shown in FIG. 10.
Figure 12:
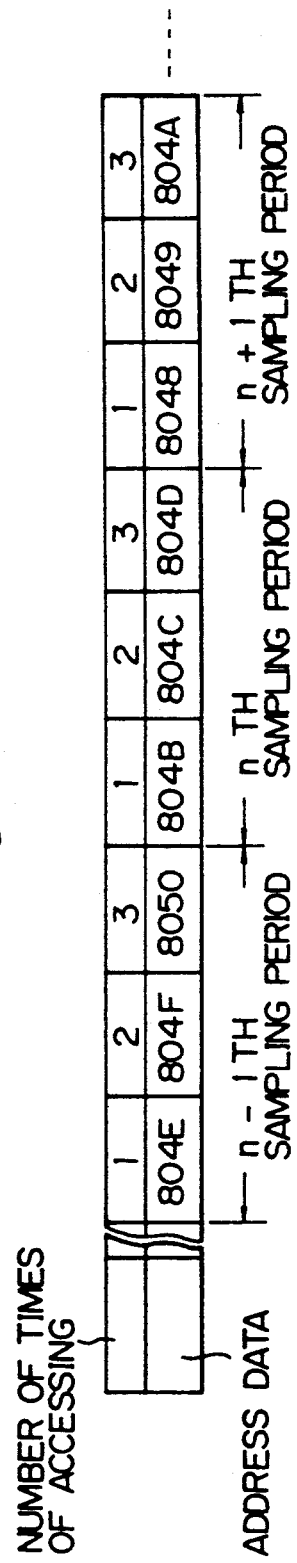
FIG. 12 is a diagram showing three addresses in each sampling period.

The access circuit 42 performs the writing and reading of data into and from the external RAM 15 in the so-called normal mode access. In the normal mode access, the $\overline{RAS}$ signal is issued to the external RAM 15 for every time of access to the external RAM 15 for the reading and writing of data, and the $\overline{CAS}$ signal is issued slightly after the issuing of the $\overline{RAS}$ signal, as illustrated in FIG. 11. At the first access in one sampling period, eight low-order bits of the base address data are set as the row address, and eight high-order bits of the base address data are set as the column address. The set row and column addresses are supplied to the address terminals of the external RAM 15. At the second access, a "1" is added to the base address data, and eight low-order bits [AL1] of the base address data are set as the row address, and eight high-order bits [AH1] of the base address data are set as the column address, and the set address data are respectively supplied to the address terminals of the external RAM 15. Similarly, at the third access, a value "2" is added to the base address data, and eight low-order bits [AL2] of the base address data are set as the row address, and eight high-order bits [AH2] of the base address data are set as the column address data, and the set address data are respectively supplied to the address terminals of the external RAM 15. Furthermore, the base address data is treated as the 16-bit data in the summing operation. Accordingly, it is possible that a carry from the eight low-order bits to the eight high-order bits occurs. Therefore, [AH0] through [AH2] may not have the same value.

Changes in the designated address values by the above-described address designating operation in each sampling period are shown in FIG. 11. As will be appreciated from this figure, accessing is possible to the whole address space which can be designated by 16 bits. Thus, the delay time can be extended to a maximum value determined by the memory capacity.

In the case of a 16-bit address, the address space is as large as $2^{16}$, and there would be residual addresses as a result of accessing by three addresses. However, since the carry and borrow are ignored during the summation and multiplication for the address operation, the residual addresses do not cause any problem. When all of the addresses which can be designated by 16 bits are accessed one time, addresses which are slightly shifted are accessed by three addresses at sampling intervals.

Since the 24-bit signal data is read-out or written by the access of the row address at a rate of three addresses per sampling period, the number of row addresses which can be accessed in 4 milliseconds at a sampling frequency of 32 KHz will be equal to 384 (4 milliseconds÷(1/32 KHz)×3=384). This value is sufficiently greater than the actual number (256) of row addresses, and the external RAM 15 is refreshed while leaving sufficient room.

As specifically described in the foregoing, the second embodiment of the audio signal data processing apparatus according to the present invention is provided with a ring counter for performing the counting within the number of the address data bits at sampling intervals, and a unit for designating the delay time data for the writing and reading operations. The designated delay time data and the count data of the ring counter are added together, the summing value is multiplied with a predetermined data representing the number of access times to the delay memory for each word in one sampling period, and the result of multiplication is used as the base address data. The writing and reading addresses are set according to the base address data produced as described. Therefore, addresses of the delay memory having the continuous access number are sequentially designated at sampling intervals, so that all of the addresses are designated. Therefore, a longer delay time can be secured. Furthermore, since row addresses for which the number of access times only is different are designated for one signal data, the delay memory can be refreshed more sufficiently as compared with the conventional arrangement.

The third embodiment of the present invention will be described hereinafter. In this embodiment also, the audio signal data processing system is constructed as shown in FIG. 1, and the explanation of each element will not be repeated. As in the second embodiment described above, the microcomputer 24 executes the operations shown in FIG. 9. Furthermore, the initial reflective sound data processing operation in the DSP is performed in the same manner as in the previous embodiments.

The equivalent circuit performing an operation the same as the above mentioned operation is constructed as the initial reflective sound processing part of FIGS. 13A. In FIG. 13A, the digital delay circuits 61 and 62 perform the operation of producing a delay in the audio signal of the left and right channels. The multiplying circuits 63 and 64 which are respectively made up of a plurality of multipliers perform the multiplication of coefficients by the signal data and the delay audio signal data. The adders 65 and 66 add up the results of the multiplication.

Figure 14:
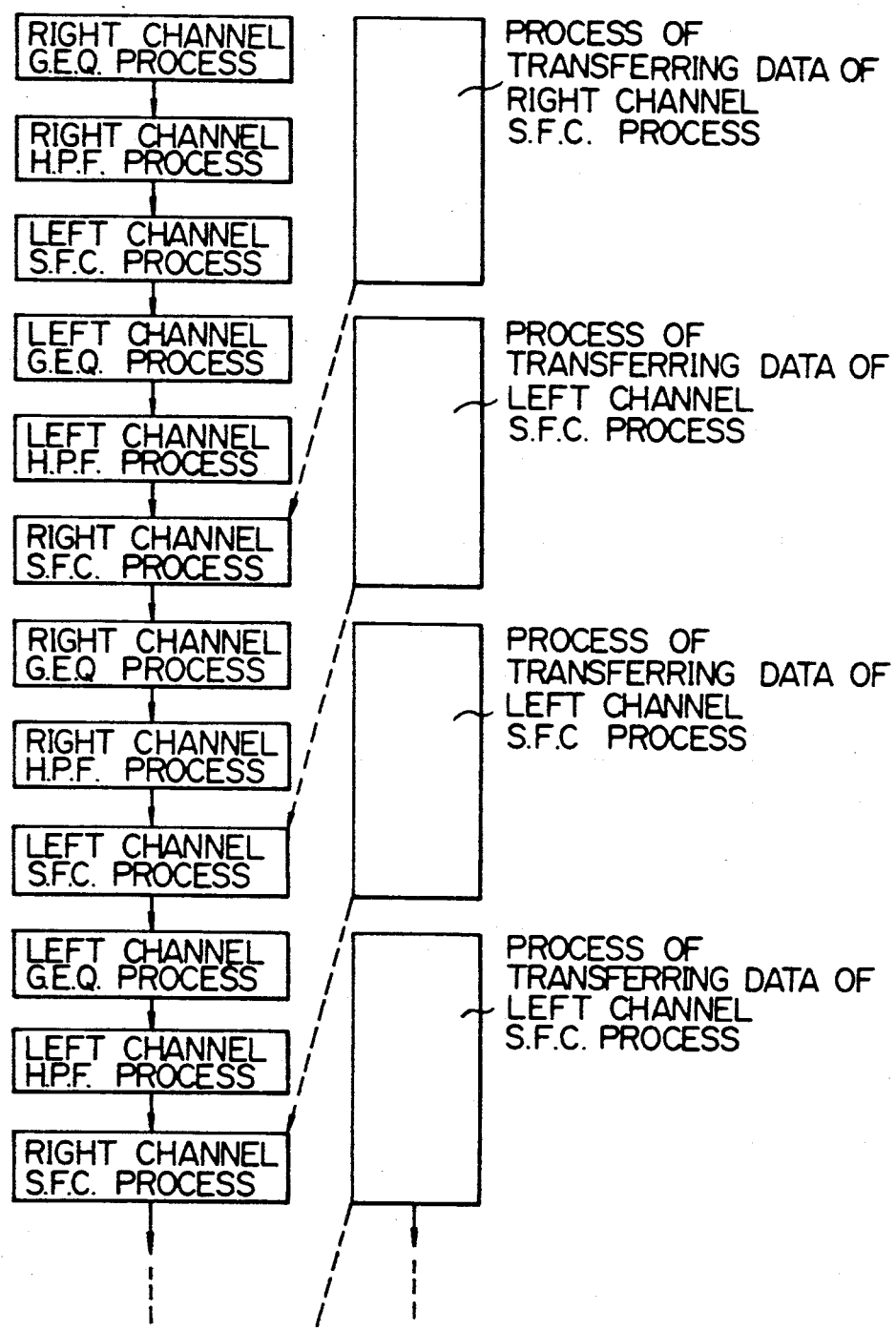
FIG. 14 is a diagram showing the order of the processing operations.

As shown in FIG. 14, the graphic equalizer (G.E.Q) process of the right channel, a high-pass filter (H.P.F) process of the right channel, the sound field control (S.F.C) process of the left channel, the graphic equalizer process of the left channel, the high-pass filter process of the left channel, and the sound field control process of the right channel are repeatedly performed in order. These six processes are performed by using the first data bus 4. On the other hand, the above-mentioned process of generating the delay audio signal data is performed in parallel with the graphic equalizer process, the high-pass filter process, and the sound field control process. Specifically, as shown in FIG. 14, during the graphic equalizer process and high-pass filter process of the right channel and the sound field control process of the left channel, the delay audio signal data for the sound field control process of the right channel is transferred from the external RAM 15 to the signal data RAM 6 through the second data bus. Similarly, during the graphic equalizer process and high-pass filter process of the left channel and the sound field control process of the right channel, the delay audio signal data for the sound field control process of the left channel is transferred from the external RAM 15 to the signal data RAM 6 through the second data bus. These transfer processes and the sound field control process are combined together, so that the above-described initial reflective sound process is realized.

Figure 13B:
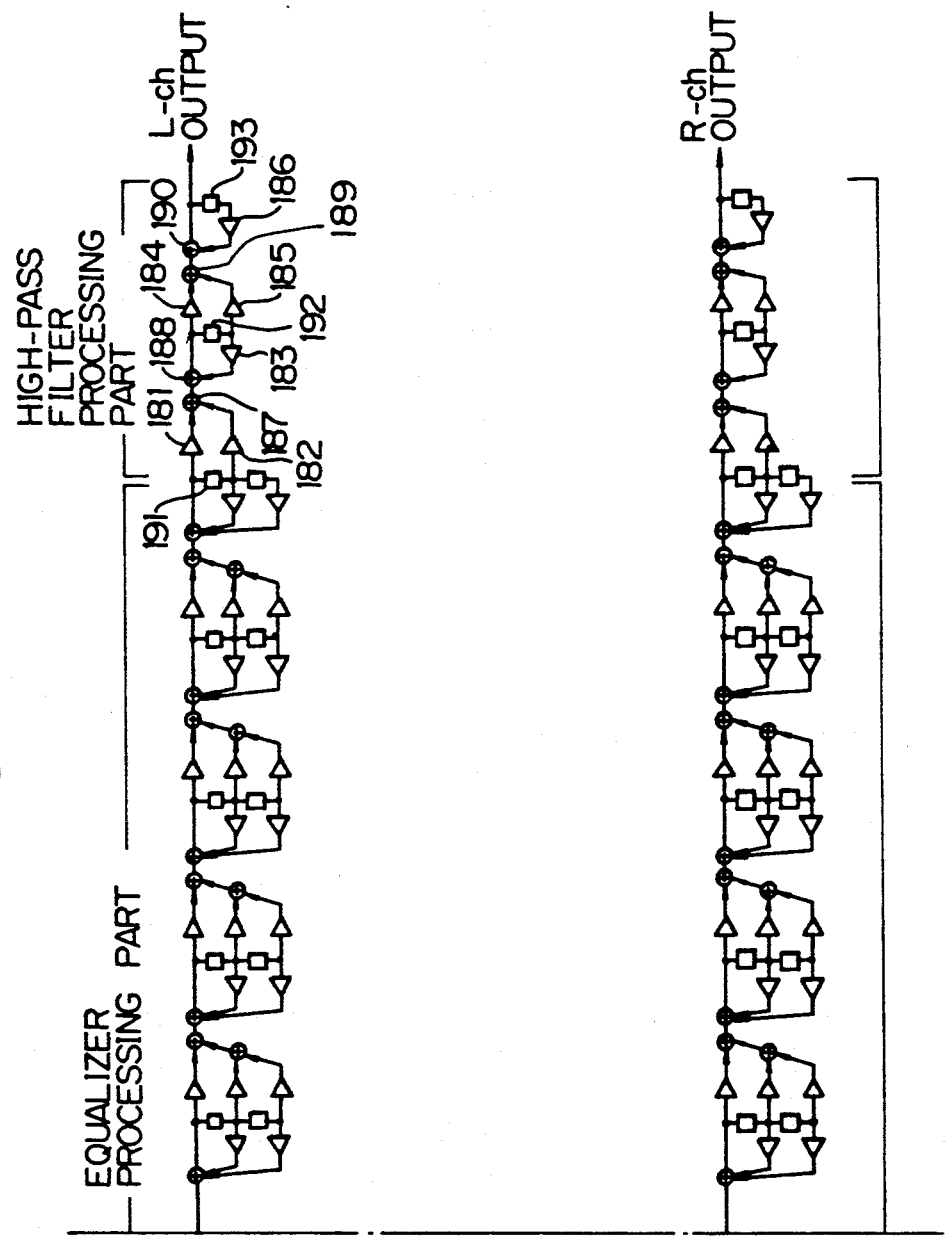

An equivalent circuit performing an operation the same as the above-described graphic equalizer process is shown in FIGS. 13A and 13B. The equivalent circuit is constructed as the equalizer processing part shown in FIGS. 13A and 13B, and as provided in the stage after the initial reflective sound processing part. In the equalizer processing part, seven circuits respectively for seven frequency bands are connected in series. As enclosed by the dashed line, the circuit for each frequency band is made up of multipliers 171 through 175 for multiplying the coefficient $\alpha_0$ and the like, and adders 176 through 178 for adding the output signals of the multipliers 171 through 175, and delay elements 179 and 180. Operations of the delay elements 179, 180, delay elements 179, and 180 are correspond to the operations in one step of the sequence control program. Therefore, the signal data supplied to the multiplier 172 is data one step before the signal data supplied to the multiplier 171, and the signal data supplied to the multiplier 173 is data one step before the signal data supplied to the multiplier 172. This relationship is also present for the signal data supplied to the multipliers 174 and 175.

After the graphic equalizer process operation described above, the high-pass filter process operation is performed. This high-pass filter process operation is almost the same as the above-described graphic equalizer process operation. In this operation, the coefficient data is sequentially read-out from the RAM 10, and transferred to the buffer memory 9. On the other hand, the reading address of the RAM 5 is designated by the memory control circuit 31 at each execution step. The signal data is read-out from the designated address and transferred to the buffer memory 7 through the data bus 4. Each time when the signal data and the coefficient data are transferred to the buffer memories 7 and 9, the data are multiplied with each other by the multiplier 8. The result of the multiplication is accumulated by the ALU 11 and the accumulator 12. When the high-pass filter process operation is completed, the signal data obtained by the process is supplied from the accumulator 12 to the interface 3 through the data bus 4, and in turn issued from the DSP 2 through the muting switch circuit 30.

An equivalent circuit performing an operation the same as the above-described high-pass filter process operation is shown in FIG. 13B. The equivalent circuit is constructed as the high-pass filter processing part in this figure, and made up of multipliers 181 through 186 for multiplying the coefficient, adders 187 and 188 for adding the output signals of the multipliers 181 through 183, adders 189 and 190 for multiplying the output signals of the multipliers 184 through 186, and delay elements 191 through 193. By the provision of the delay element 191, the signal data supplied to the multiplier 182 becomes data one step before the signal data supplied from the equalizer process part to the multiplier 181. Similarly, by the provision of the delay element 192, the signal data supplied to the multipliers 183 and 185 becomes data one step before the signal data supplied to the multipliers 183 and 185. In addition, by the delay element 193, the signal data supplied to the multiplier 186 becomes data one step before the signal data issued from the adder 190.

In the embodiment described above, the system is constructed such that the high-pass filter process is performed after the graphic equalizer process. However, it is also possible to arrange the system so that the high-pass filter process is performed before the graphic equalizer process or the initial reflective sound process.

As specifically described in the foregoing, in the third embodiment of the audio signal data processing system according to the present invention, the arithmetic means which performs the multiplication of the coefficient data by each sample data of the audio signal data and the accumulation operation is adapted to perform an operation providing a high-pass filter characteristic. Therefore, even if the signal data includes dc components, the dc components are removed by the high-pass filter function. This means that the off-set adjustment may not be effected thoroughly in the A/D converter for converting the incoming analog signal to the signal data. Furthermore, there is an advantage that the generation of noises due with dc components mixed to the signal data when the muting switch circuit is turned off is reliably prevented.

What is claimed is:

1. An audio signal data processing system comprising:
    input means for sequentially supplying incoming audio signal data;
    data memory control means for writing and reading-out said audio signal data into and from a data memory;
    delay memory control means for sequentially reading-out said audio signal data from said data memory and storing said audio signal data into a location of a delay memory indicated by a writing address and for reading-out said audio signal data from a location of said delay memory indicated by a reading address and writing said audio signal data into said data memory;
    arithmetic means for performing an arithmetic operation of multiplying predetermined coefficient data by said audio signal data written into said data memory; and
    output means for forwarding said audio signal data in accordance with a result of said arithmetic operation by said arithmetic means, wherein said delay memory control means includes ring counter means for performing a counting operation within a number of bits of address data at sampling intervals, means for designating delay time data for writing and reading operations, summing means for adding said delay time data and count data from said ring counter means, multiplying means for multiplying data representing a number of accessing times required for accessing one word of data for said delay memory to output data of said summing means, to provide base address data, and setting means for setting a writing or reading address in accordance with said base address data.

2. The system claimed in claim 1 wherein said setting means produces said writing or reading address in one-word access by using a value obtained each time when a 1 is added to said base address data a number of times corresponding to said data representing said number of accessing times.

3. An audio signal data processing system comprising:
    input means for sequentially supplying incoming audio signal data,
    data memory control means for writing and reading-out said audio signal data into and from a data memory,
    delay means for sequentially reading-out said audio signal data from said data memory and storing said audio signal data into a delay memory and subsequently reading-out said audio signal data sequentially from said delay memory and writing said audio signal data into said data memory,
    arithmetic means for performing an arithmetic operation of multiplying predetermined coefficient data by each sample data of said audio signal data written into said data memory and accumulating multiplied values, and
    output means for forwarding said audio signal data in accordance with a result of said arithmetic operation by said arithmetic means, wherein said arithmetic means performs an operation constituting a high-pass filter characteristic with respect to predetermined sampled data.

* * * * *